(12) United States Patent
Serrano et al.

(10) Patent No.: US 7,138,840 B2
(45) Date of Patent: Nov. 21, 2006

(54) SINGLE VCO/LOOP FILTER TO CONTROL A WOBBLE AND READ CIRCUIT OF A DVD AND/OR CD RECORDER

(75) Inventors: Louis J. Serrano, San Jose, CA (US); Shih-Ming Shih, San Jose, CA (US); Shirish A. Altekar, Los Gatos, CA (US)

(73) Assignee: LSI Logic Corporation, Milpitas, CA (US)

( * ) Notice: Subject to any disclaimer, the term of this patent is extended or adjusted under 35 U.S.C. 154(b) by 556 days.

(21) Appl. No.: 10/674,165

(22) Filed: Sep. 29, 2003

(65) Prior Publication Data

US 2005/0068866 A1    Mar. 31, 2005

(51) Int. Cl.
*H03L 7/06* (2006.01)
(52) U.S. Cl. .................. 327/158; 327/159; 327/298
(58) Field of Classification Search .................. None
See application file for complete search history.

(56) References Cited

U.S. PATENT DOCUMENTS

| | | | | |
|---|---|---|---|---|
| 5,506,627 A | * | 4/1996 | Ciardi | 348/515 |
| 5,898,328 A | * | 4/1999 | Shoji | 327/157 |
| 6,075,416 A | * | 6/2000 | Dalmia | 331/25 |
| 6,285,225 B1 | * | 9/2001 | Chu et al. | 327/158 |
| 6,310,521 B1 | * | 10/2001 | Dalmia | 331/11 |
| 6,404,247 B1 | * | 6/2002 | Wang | 327/158 |
| 6,794,946 B1 | * | 9/2004 | Farjad-Rad | 331/16 |
| 6,867,627 B1 | * | 3/2005 | Murtagh | 327/158 |

* cited by examiner

*Primary Examiner*—Quan Tra
*Assistant Examiner*—An T. Luu
(74) *Attorney, Agent, or Firm*—Christopher P. Maiorana, P.C.

(57) ABSTRACT

An apparatus comprising a clock generation circuit, a detect circuit and a select circuit. The clock generator circuit may be configured to generate an output clock signal in response to a control signal. The detect circuit may be configured to generate a detect signal in response to (i) the output clock signal and (ii) an input signal. The select circuit may be configured to generate the control signal by selecting (i) a first input when in a first mode (ii) the detect signal when in a second mode. The first and second modes are selected in response to a selection signal.

12 Claims, 10 Drawing Sheets

SINGLE VCO/LOOP FILTER TO CONTROL A WOBBLE AND READ CIRCUIT OF A DVD AND/OR CD RECORDER

FIELD OF THE INVENTION

The present invention relates to optical storage devices generally and, more particularly, to single VCO/loop filter to control a wobble and read circuit of a DVD and/or CD recorder.

BACKGROUND OF THE INVENTION

Consumer electronics products are extremely price sensitive. Anything that can be done to reduce the cost of the product is very important. One way to reduce cost is to reduce the die size of the chip. Another way to reduce cost is to reduce the pin count of the chip and/or the number of components needed to support the chip.

In conventional DVD or CD-Recordable chip sets one timing loop (known as the read channel path) is used to recover user data from the disc. A second timing loop (known as the wobble data path) is used to recover preformatted information. These timing loops include analog loop filters and voltage controlled oscillators (VCOS). Duplicating similar timing loops uses additional die area, pin count, and passive components when compared to a single loop system.

One hallmark of a recordable DVD or CD disc is the preformatted position information encoded independently of user data. In contrast, a read only DVD and CD has coarse position information that is encoded in the headers of the user data blocks. Pits and lands representing user data are used to calculate the fine track error. The preformatted information is used to provide positioning information in the absence of user data. There is no user data on a new (or blank) disc.

Consequently, a recordable system needs a way to recover this preformatted information. A timing loop is implemented separately from the timing loop used to recover the user data. The particular details of the extra timing loop depends on the particular format of the recordable DVD/CD. Recordable media normally wobble the track slightly at a constant frequency to generate a clock signal used to synchronize the writing of data to the disc. The wobble ensures that the data is written to a known location. In addition to the wobble clock, coarse position information is written on the disc. The way the coarse information is written depends on the particular format of the recordable disc.

The CD-R and CD-RW formats use frequency modulation to encode a bit stream containing synchronization information and data block number. The DVD-R and DVD-RW formats use pre-formatted pits on the land adjacent to the track. Such land pre-pits (LPP) occur at particular times relative to the wobble. Detection involves opening a window in relation to the phase of the wobble. Finally, the DVD+R and DVD+RW formats encode the position data using a single cycle binary phase shift keying (BPSK) modulation method on the wobble so that a small set of the wobble cycles are opposite in phase to the rest.

Because the coarse position information is recorded in or synchronously to the wobble, the term "wobble data" is used to distinguish the coarse position information from user data. A common factor for each of the recording formats is that the recording system needs an accurate timing loop to (i) demodulate the encoded coarse position data and (ii) properly align the write data with the wobble.

Conventional systems use a timing loop dedicated to the wobble channel to accomplish such timing. Since the read channel also uses a timing loop, conventional systems implement two timing loops to simultaneously, or nearly simultaneously (i.e., one to read user data and one to demodulate the wobble data). Since each timing loop includes a phase detector, a loop filter, and a VCO, much of the circuitry in the device is redundant. The primary disadvantage of conventional solutions is that such solutions duplicate circuitry, which increases the cost of the device.

It would be desirable to implement a CD or DVD recording system that combines components from a read channel and a wobble channel to reduce the total number of components.

SUMMARY OF THE INVENTION

The present invention concerns an apparatus comprising a clock generation circuit, a detect circuit and a select circuit. The clock generator circuit may be configured to generate an output clock signal in response to a control signal. The detect circuit may be configured to generate a detect signal in response to (i) the output clock signal and (ii) an input signal. The select circuit may be configured to generate the control signal by selecting (i) a first input when in a first mode (ii) the detect signal when in a second mode. The first and second modes are selected in response to a selection signal.

The objects, features and advantages of the present invention include providing a loop filter that may (i) control a wobble and read circuit of a DVD and/or CD recorder, (ii) implement a single clock loop to control two or more circuits, and/or (iii) be implemented using either an analog or a digital clock generator.

BRIEF DESCRIPTION OF THE DRAWINGS

These and other objects, features and advantages of the present invention will be apparent from the following detailed description and the appended claims and drawings in which:

DETAILED DESCRIPTION OF THE PREFFERRED EMBODIMENTS

Figure 1:
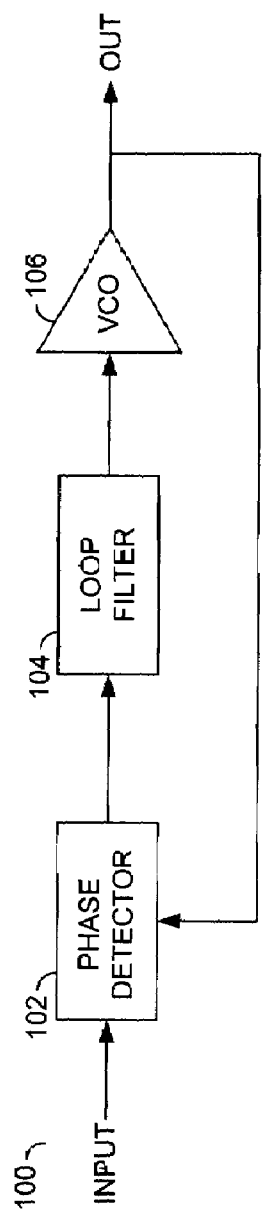
FIG. 1 is a diagram illustrating a phase lock loop.

Referring to FIG. 1, a circuit 100 is shown illustrating a phase locked loop (PLL) in accordance with a preferred embodiment of the present invention. The PLL 100 generally comprises a phase detector 102, a loop filter 104, and a voltage controlled oscillator (VCO) 106. The PLL 100 may be used as a timing loop. The circuit 100 may generate a signal OUT. The signal OUT may be used by a recordable CD or DVD recorder where a read channel and a wobble channel demodulate different signals. The loop filter 104 and the VCO 106 may be reused for each channel. For design simplicity, the phase detector 102 for each channel is not generally reused in both the read channel and the wobble channel. In particular, a phase detector implemented for the wobble channel is generally implemented separately from the phase detector implemented from the read channel.

Figure 2:
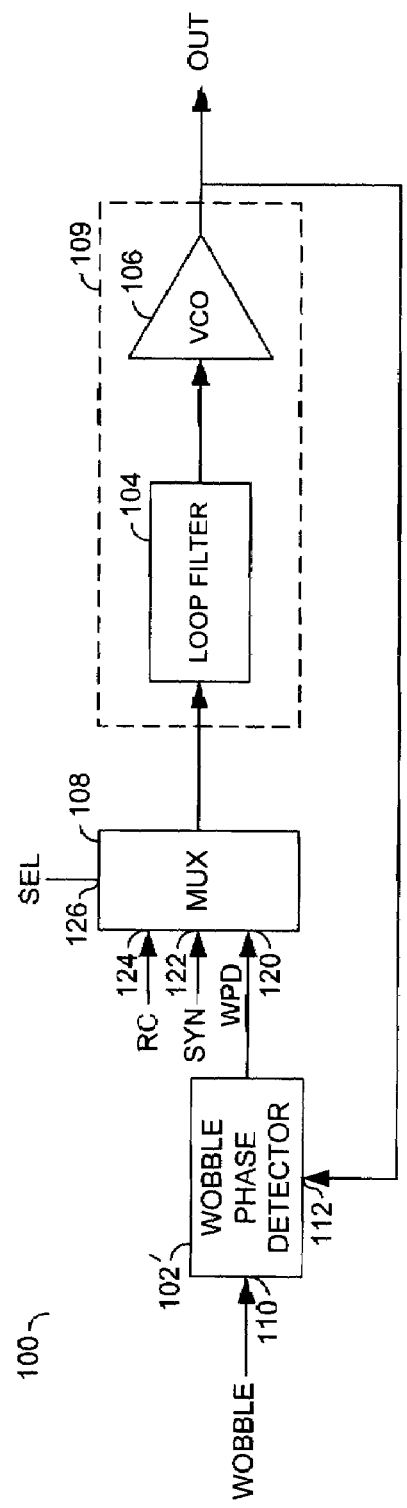
FIG. 2 is a diagram illustrating a multiplexer configured between a wobble phase detector and the loop filter.

Referring to FIG. 2, a diagram of the circuit 100 is shown implementing a selection circuit 108. The loop filter 104 and the VCO 106 may implement a clock generation block (or circuit) 109. The phase detector may be implemented as a wobble phase detector 102'. The wobble phase detector 102' generally has an input 110 that receives a signal (e.g., WOBBLE) and an input 112 that receives the signal OUT. The signal WOBBLE may be generated by the track on a particular disc. The circuit 102' generates a signal (e.g., WPD) in response to the signal WOBBLE and the signal OUT. The signal WPD represents the relative phase between the signal OUT and the signal WOBBLE. The signal WOBBLE may be sensed from the disc, while the signal OUT may be generated by the circuit 100. The timing loop may be used to drive the signal WPD to zero so that the signal WOBBLE and the signal OUT are in phase lock. The clock generation circuit 109 may be implemented as an analog clock generator. However, other clock generators (e.g., a digital clock generator) may be implemented to meet the design criteria of a particular implementation.

The selection circuit 108 may be implemented as a multiplexer. The selection circuit 108 may have an input 120 that may receive the signal WPD, an input 122 that may receive a signal (e.g., SYN), an input 124 that may receive a signal (e.g., RC) and an input 126 that may receive a selection signal (e.g., SEL). The selection circuit 108 may multiplex the output of either the signal WPD or the signal RC to the input to the loop filter 104. The selection circuit 108 generally allows the VCO 106 to be controlled either by the read channel (e.g., with the signal RC) or by the wobble channel (e.g., with the signal WPD).

The signal SYN may be a synthesized signal generated by a frequency synthesizer. The signal SYN may be a periodic signal configured to oscillate at a synthesized frequency. The signal SYN may be used to provide a frequency to the loop filter 104 while the CD or DVD is seeking from one track to another, during which time no signal is available from either the signal WOBBLE or the signal RC. The synthesized frequency signal SYN is generally selected to place the loop filter 104 and the VCO 106 into a state so that the system 100 may quickly lock to either the read signal RC or the signal WOBBLE upon arrival at the target track.

Read user data and write user data are not needed at the same time. However, read user data and read wobble data may be needed at the same time. The wobble data may be used to verify a position on the disc while reading user data. The time needed to transition from locking to the user data (for reading) to locking to the signal WOBBLE (for writing) may be shortened. Reducing the lock time will reduce the overall time to transition from a read to a write operation. The same loop filter 104 and VCO 106 may be used simultaneously in either mode. CD and DVD-recordable devices have user data that is related in frequency to the signal WOBBLE. For example, in a DVD-R/RW application, there are 186 user data clocks per wobble cycle. For a DVD+R/RW application, there are 32 user data clock per wobble cycle. For a CD-R/RW application, there are 196 user data clocks per wobble cycle.

Implementing a phase lock with the user data may ensure phase lock with the signal WOBBLE and the wobble data, although there may be a residual phase error. Simultaneous access generally needs (i) clocking to demodulate the wobble data when the timing loop is locked to the user data and/or (ii) a method to select the correct phase for the wobble demodulation clock (to be described in detail in connection with FIGS. 3 and 4). For example, when in the read mode, the VCO 106 is generally in phase lock with the user data. The VCO 106 may generate a clock signal that is a multiple (e.g., 32, 186, or 196) of the wobble cycle. However, the particular choice of phases from which to select the wobble demodulation clock may be varied to meet the design criteria of a particular implementation. For example, for a DVD+R/RW application, the wobble cycle will last for 32 user clocks. The demodulator may pick any of the 32 user data clocks as the best starting point of a wobble cycle. This translates to about a 1.5% phase error for a worst case, which has only a small impact (e.g., less than 0.1 dB) on the signal to noise ratio (SNR).

Figure 3:
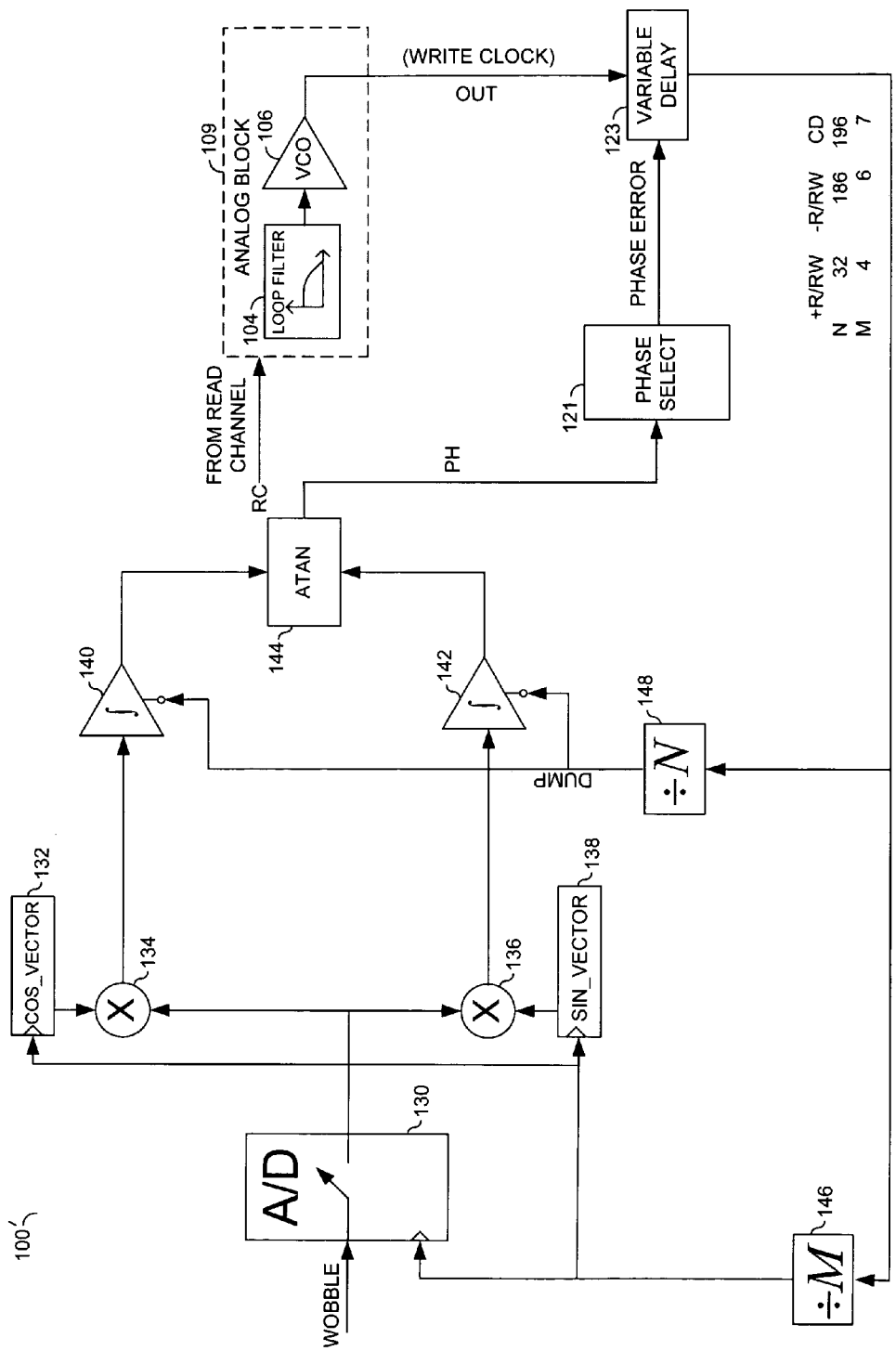
FIG. 3 a more detailed diagram illustrating a phase selector.

Referring to FIG. 3, a more detailed circuit 100' illustrating the phase detector with a phase selector 121 is shown. Instead of driving the VCO 106 via the loop filter 104 to adjust the timing of clock signal OUT, the circuit 100' drives a variable delay line 123 to select the best phase for the divided clock. The variable delay does not alter the loop filter 104, since the loop filter 104 is being controlled by the signal RC from the read channel. The circuit 100' generally comprises a block (or circuit) 130, a block (or circuit) 132, a block (or circuit) 136, a block (or circuit) 138, a block (or circuit) 140, a block (or circuit) 142, a block (or circuit) 144, a block (or circuit) 146 and a block (or circuit) 148. The block 132 may be implemented as a cosine vector block. The blocks 134 and 136 may be implemented as multiplication blocks. The block 138 may be implemented as a sine vector block. The blocks 140 and 142 may be implemented as integrator blocks. The block 144 may be implemented as an arctangent block.

The relative phase is estimated, for example, by multiplying the signal WOBBLE by sine (with the blocks 136 and 138) and cosine (with the blocks 132 and 134). The block 132 and block 138 are driven by the VCO clock signal OUT, after being divided by M (where M is an integer) with a divider block 146. The integrating blocks 140 and 142 may be implemented to eliminate a double frequency term and higher harmonics that may arise if the sine and cosine vector are not purely sine and cosine (but just approximations). A signal (e.g., DUMP) may be a divided version of the signal OUT that is phase matched to the frequency and phase of the signal WOBBLE. The integrator blocks 140 and 142 present signals to the arctangent block 144. The output of the arctangent block 144 comprises relative phase (e.g., PH). When the integrated phase error PH crosses a predetermined threshold, a signal (e.g., PHASE_ERROR) phase alters the variable delay line block 123. The proper phase of the VCO clock signal OUT is selected for wobble data demodulation. The signal OUT may be adjusted in several iterations to find the best phase. The wobble data can be demodulated while (e.g., simultaneously) the read channel controls the VCO 106.

The analog to digital (A/D) sample block 130 is driven by the VCO 106 and generally controlled by the read channel signal RC. The sample block 130 is also affected by the selected signal PHASE_ERROR. The write clock signal OUT is divided by the divider block 146, which is generally format dependent. Thus, for example, a DVD+R drive will have 32÷4=8 samples per wobble cycle. The output of the A/D circuit 130 takes two branches. One branch is multiplied by a sine vector block 138. Another branch is multiplied by a cosine vector block 132. After integration for one cycle, the output of the sine block 138 is cos θ, while the output of the cosine block 132 is sin θ. θ is the phase error between the signal WOBBLE and the signal OUT. Taking the arctangent yields θ

Multiplexing the input to the loop filter 104 allows both the read channel and wobble channel (and the synthesizer) to control the VCO 106. Various modifications may be implemented. In one example, two loop filters may be implemented. Each loop filter may need at least one capacitor so that the timing loop can lock in the presence of frequency offsets. However, duplicating such a capacitor may consume either additional die area or another pin if the capacitor is implemented off chip. Such additional overhead is normally balanced against a potential increase in cost. The capacitor holds the state memory for the VCO 106, so additional time will be needed to bring a second capacitor to the right state in a transaction from read to write.

The phase detector 102' and the phase selector circuit 121 generally select the best phase of the VCO clock signal OUT to drive the wobble demodulation circuit (not shown). This maximizes the SNR of the wobble data, and minimizes the frequency acquisition time when changing mode from read to write.

The present invention may be used to eliminate at least one loop filter and at least one VCO. Since the die area to implement a VCO may be significant, the present invention may provide a significant cost reduction when compared with conventional approaches. Removing at least one loop filter and one VCO will reduce the cost of the chip without a loss of functionality. The present invention uses additional digital logic to reduce components. The added cost of the added digital logic is negligible.

Figure 4:
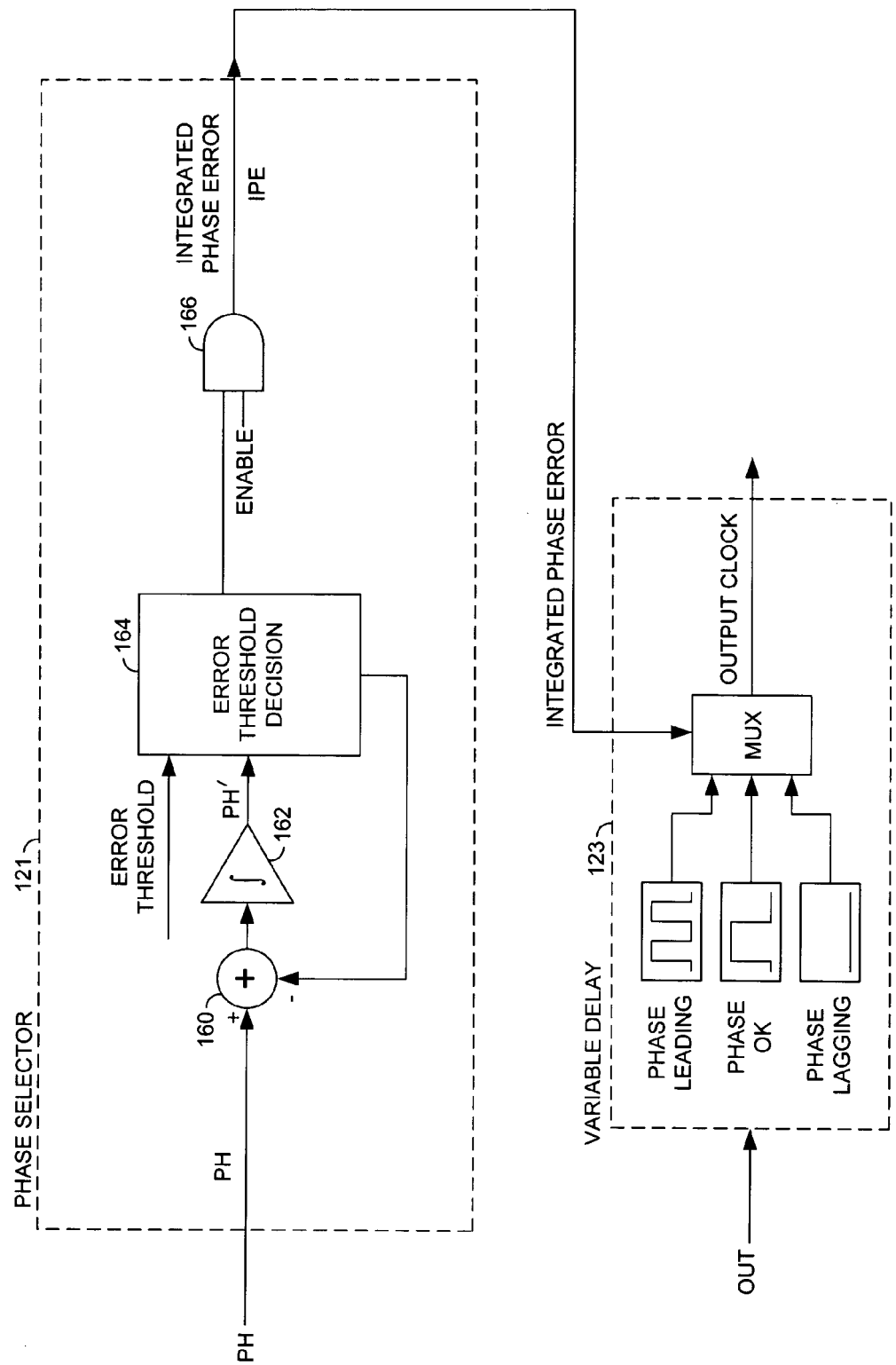
FIG. 4 a more detailed diagram of the phase selector with a variable delay.

Referring to FIG. 4, a more detailed diagram of the phase selector 121 and the variable delay 123 is shown. The phase selector 121 generally comprises an adder 160, an integrator 162, a threshold block (or circuit) 164, and a gate 166. The variable delay generally receives the divided VCO signal OUT. The phase selector 121 generally receives the signal PH.

An alternative implementation of the variable delay 123 may be used by temporarily changing the divider (e.g., from a divide by 4 to a divide by 3 for the DVD+R/RW case) if the signal OUT is leading the signal WOBBLE. The divider may also be changed (e.g., from 4 to 5), if the signal WOBBLE is leading the signal OUT.

The integrator 162 integrates the phase error signal PH. The block 164 compares the integrated value PH' to a pre-programmed threshold. If the integrated value PH' exceeds the threshold, the integrated value is reduced and the integrated phase error signal IPE is set high. In the variable delay, if the signal WOBBLE is leading the VCO 106, two clock pulses are issued at the next VCO clock cycle, advancing the phase of the divided signals by one cycle of the VCO clock signal OUT. If the integrated value PH' falls below the negative of the threshold, the integrated value is increased and the integrated phase error is set low. In the variable delay the VCO clock signal OUT is skipped, slowing the phase of the divided signals by one cycle of VCO clock signal OUT. Most of the time, the integrated phase error is smaller in magnitude then the threshold. In this case one clock pulse is issued for each pulse of the VCO clock signal OUT that is received.

The following description provides details of timing and wobble data extraction. Wobble provides timing information used to generate write clock. Timing information for various standards may include (i) DVD+R/RW at 820 KHz (32 write clocks/wobble cycle), (ii) DVD-R/RW at 140 KHz (186 write clock/wobble), and (iii) CD-R/RW at 22.05 KHz (196 write clock/wobble). Position data embedded in wobble for DVD+R/RW and CD-R/RW may be (i) DVD+R/RW uses single cycle BPSK and (ii) CD-R/RW uses FM modulation.

Figure 5:
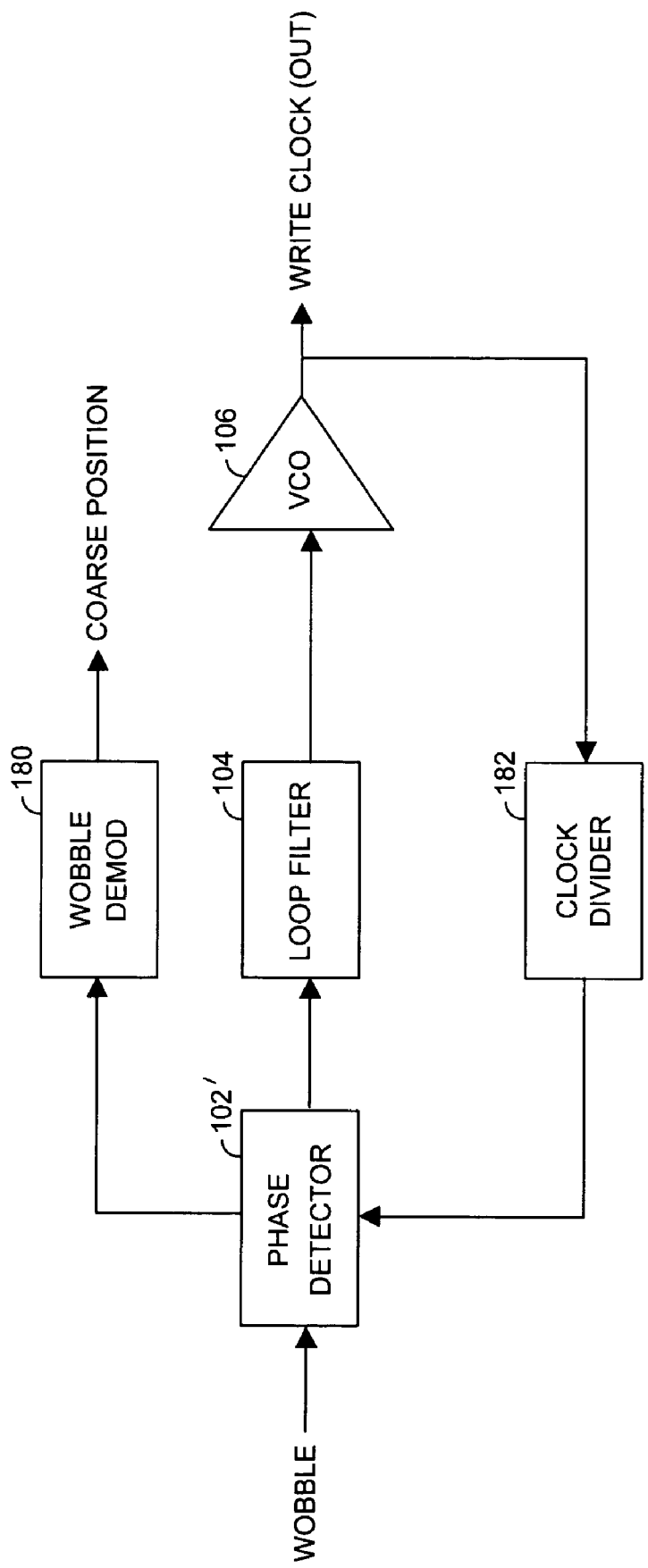
FIG. 5 illustrates a wobble channel diagram.

Referring to FIG. 5, a wobble channel diagram is shown. The loop filter 104 may be implemented as either an analog or a digital device. The loop filter 104 controls the VCO 106, which generates the write clock signal OUT. The loop filter 104 also helps determine the bandwidth of the closed loop PLL. The higher the bandwidth of the closed-loop PLL, the faster the signal OUT will match the frequency and phase of the signal WOBBLE. The lower the bandwidth of the closed-loop PLL, the less the noise in the signal WOBBLE will create noise in the signal OUT. The phase detector 102' extracts relative phase between the output of the VCO 106 and the signal WOBBLE. A wobble demodulator 180 uses the signal WOBBLE and timing info to extract encoded position information. A clock divider 182 may be used to divide the signal OUT before being presented to the phase detector 102'.

In DVD-R/RW modulation, the signal WOBBLE is normally a monotone (e.g., has no encoded information). The frequency is normally 140 KHz at 1x, or 186 write clocks per wobble cycle. Position information is encoded via land pre-pits, which are demodulated in analog. Normally only the phase and frequency of a sinusoid need to be matched.

For DVD+R/RW modulation, the position information is normally encoded using BPSK (Binary Phase Shift Keying). 8 cycles containing wobble data are followed by 85 monotone cycles. These 93 wobble cycles encode one ADIP bit. For timing, ignore the wobble data cycles and this is just like -R/RW. For DVD+R/RW modulation, the following equation EQ1 may be used:

$$w(t) = \cos(w_0 t + a(n) \cdot \pi) \qquad \text{EQ 1}$$

and $$nT < t < (n+1)T$$

where $$a(n) = \begin{Bmatrix} 0 \text{ or } 1 & n = 0\ldots7 \\ 0 & n = 8\ldots92 \end{Bmatrix}$$

and $$T = 2pi/w_0$$

Figure 6:
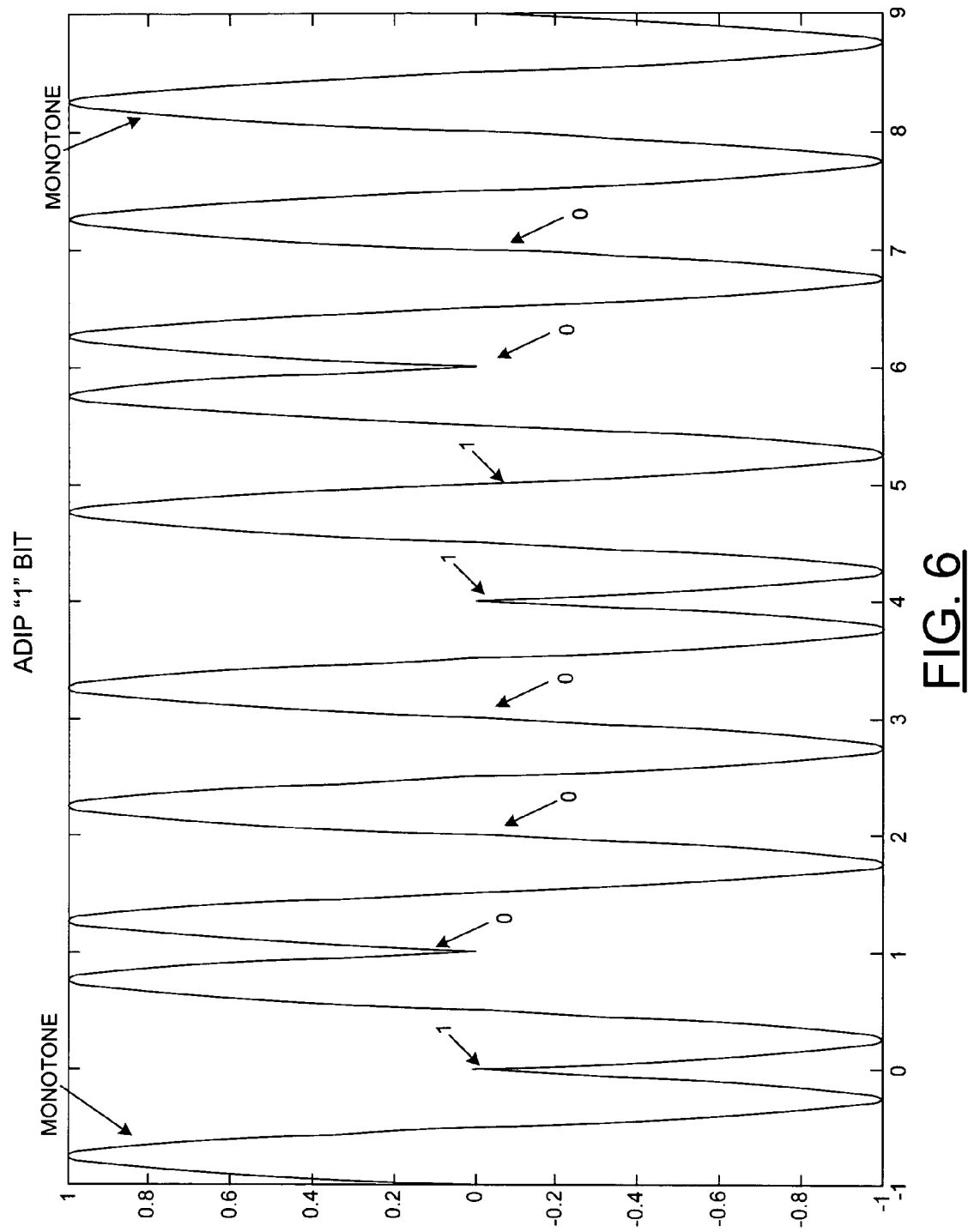
FIG. 6 illustrates a ADIP "1" bit.

An ADIP synch bit is normally 1,1,1,1,0,0,0,0.
An ADIP "0" bit is normally 1,0,0,0,0,0,1,1.
An ADIP "1" bit is normally 1,0,0,0,1,1,0,0.
For nT<t<(n+1)T, to calculate the phase of a cycle select:
  93 cycles coincides with 2 synch frames of data
  93 cycles yields one ADIP bit
  52 ADIP bits yields one ADIP word Referring to FIG. 6, eight data cycles for an address in pregroove (ADIP) "1" bit are shown. ADIP is the DVD+R/RW method of encoding data in the wobble channel.

Absolute time in pregroove (ATIP) is the CD-R/RW data encoded in the wobble. For CD-R/RW modulation, a CPFSK encodes the channel bits. The carrier is normally 22.05 KHz. A digital "1" is encoded as 22.05 KHz+1 KHz.

The frequency modulation of the carrier is only within 10% of 1 KHz. A digital "0" is encoded as 22.05 KHz–1 KHZ. Modulation is normally only within 10% of 1 KHz. Wobble data is normally encoded with a bi-phase mark (e.g., 2 channel bits per wobble data bit). A transition normally occurs between each wobble data bit. The wobble data bit 1 generally has a transition between two channel bits. The synch mark is a BPM violation. The BPM limits time at either frequency, and has zero DC. By the rules of BPM encoding, there are never more than two 0s or two 1s in a particular row. The synch mark is normally defined as the sequence of channel bits 11101000 if the previous channel bit was a 0 and 00010111 if the previous channel bit was a 1.

Because of the BPM encoding rules, there are the same number of channel bit 0s as channel bit 1s. The average frequency of the wobble signal is the carrier frequency. The maximum phase difference between the signal WOBBLE and the carrier is bounded. Since the frequency modulation is not precisely known, the bound is not precisely known. If T is the duration of a channel bit, and dF is the frequency modulation (about 1 KHz) then the biggest phase excursion in the signal WOBBLE due to the data modulation is 3*dF*T and occurs during the synch mark.

The following equation EQ2 generally defines a CD-R/RW modulation:

$$w(t) = \cos\left(2\pi f_0 t + \int_{-\infty}^{t} a(\tau) d\tau \cdot \pi\right) \quad \text{EQ 2}$$

where $$a(t) = a(n) \cdot \Delta f$$

for $nT < t < (n+1)T$ $$T = \frac{3.5}{f_0}$$

and $$a(n) = \pm 1$$

ATIP data sequence 0,1,1,0 encodes into:
a(n)=(−1,−1), (1,−1), (1,−1), (1,1) or
a(n)=(1,1), (−1,1), (−1,1), (−1,−1)

depending on the channel bit recorded prior to this sequence, a synch mark encodes to
a(n)=1, 1, 1, −1, 1, −1, −1, −1 or
a(n)=−1, −1, −1, 1, −1, 1, 1, 1 with 3½ carrier cycles per bit interpreted as an increase or decrease of phase.

The duration of an ATIP channel bit is T=3.5/F0 where F0 is the carrier frequency. Hence a channel bit 0 has something less than 3.5 cycles at frequency F0–dF and a channel bit 1 lasts for slightly more than 3.5 cycles at frequency F0+dF. Exactly how much is not really known, because dF is not known to better than 10% (e.g., 1 KHz at 1x). Two channel bits are used for one wobble data (or ATIP) bit. The discrete signal a(n) may be the sign of the frequency modulation, so that a(n)=−1 for a channel bit 0 and a(n)=+1 for channel bit 1.

Figure 7:
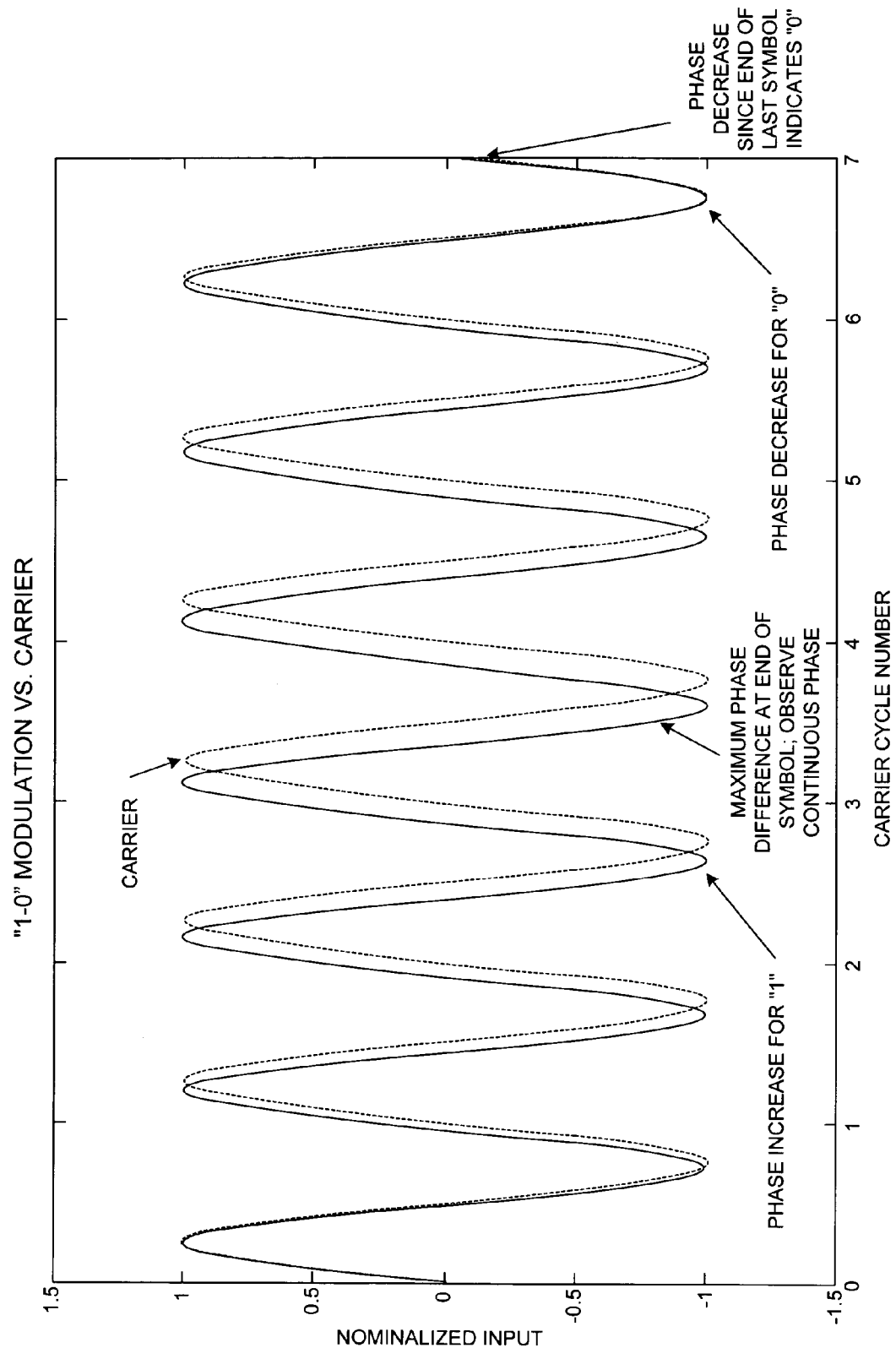
FIG. 7 illustrates a "1-0" modulator versus carrier for ATIP data on a CD-R/RW disc.

Referring to FIG. 7, a wobble signal modulated with a channel bit 1 followed by a channel bit 0 is displayed with an unmodulated carrier signal shown for reference. FIG. 7 shows the analog result of encoding a channel bit 1 followed by a channel bit zero, compared to the unmodulated carrier.

The goals of the wobble block are to (i) lock to carrier in absence of modulation (in a DVD application), (ii) lock to carrier in presence of FM modulation (in a CD application), (iii) extract BPSK information (DVD+R/RW), and (iv) extract FSK information (CD). In this case the two start at the same phase, but this is not strictly necessary.

Regardless of how the wobble data is modulated onto the wobble signal, the first step of the timing can be defined by the following equations:

$$2\sin(w_0 t + \theta_m(t)) \cdot \cos(w_0 t + \theta_v(t)) = \sin(\theta_m(t) - \theta_v(t)) + \sin(2w_0(t) + \theta_m(t) - \theta_v(t))$$

$$2\sin(w_0 t + \theta_m(t)) \cdot \sin(w_0 t + \theta_v(t)) = \cos(\theta_m(t) - \theta_v(t)) - \cos(2w_0(t) + \theta_m(t) - \theta_v(t))$$

$$\text{set}\,\theta_e(t) = \theta_m(t) - \theta_v(t)$$

Figure 8:
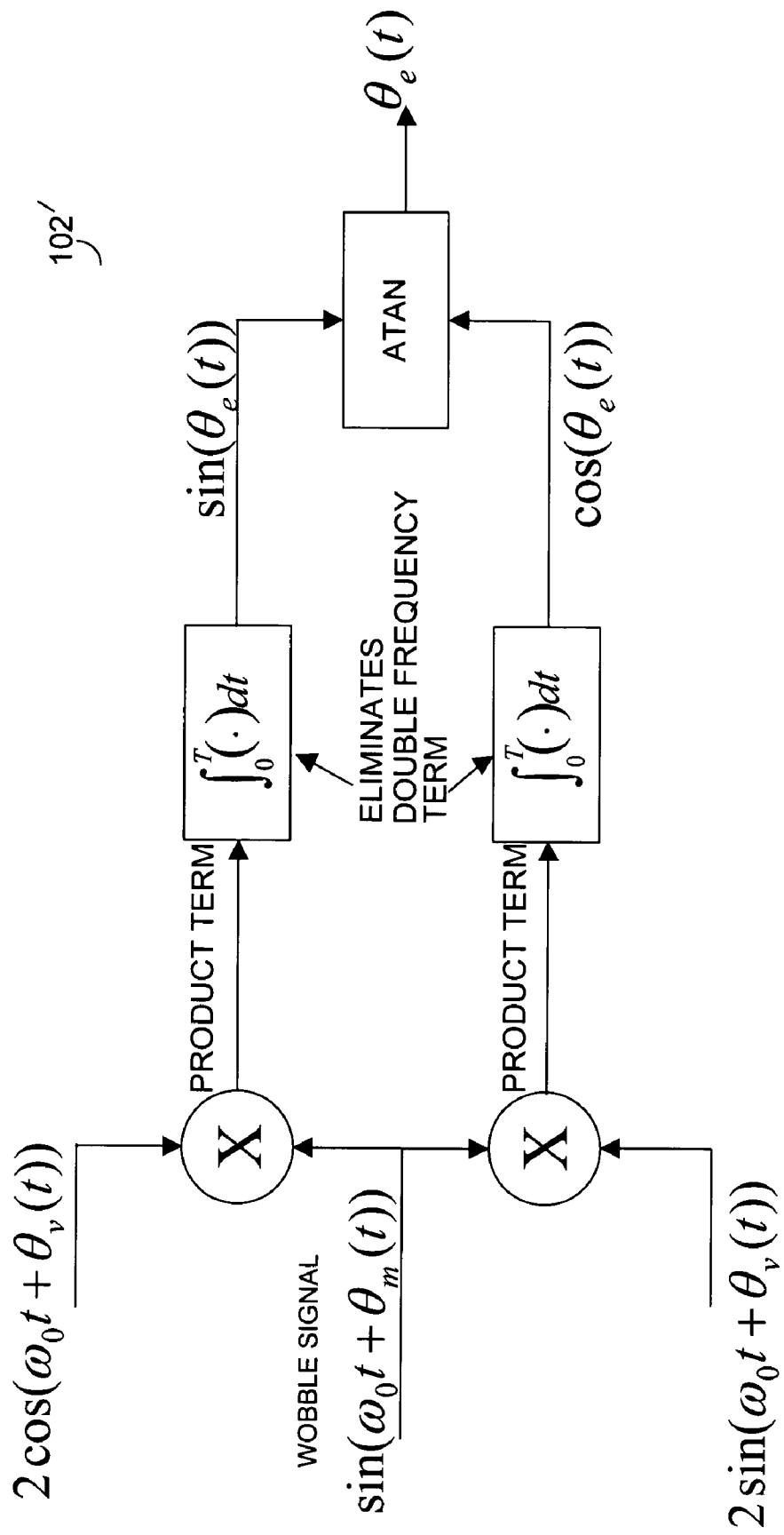
FIG. 8 illustrates a diagram of a phase detector.

Referring to FIG. 8, a diagram of a phase detector 102' is shown illustrating timing loop comments. An output of the phase detector 102' drives the loop filter 104 and the VCO 106 of FIG. 2. The phase detector 102' operates on a subsampled write clock. The phase and frequency offsets of the output of the VCO 106 and the signal WOBBLE may be eliminated. To eliminate the effect of wobble data modulation on DVD+R/RW, the VCO 106 may be held during wobble data cycles. For the CD-R/RW case, the frequency modulation arising from the ATIP data will normally only have a small effect on VCO output signal OUT.

Figure 9:
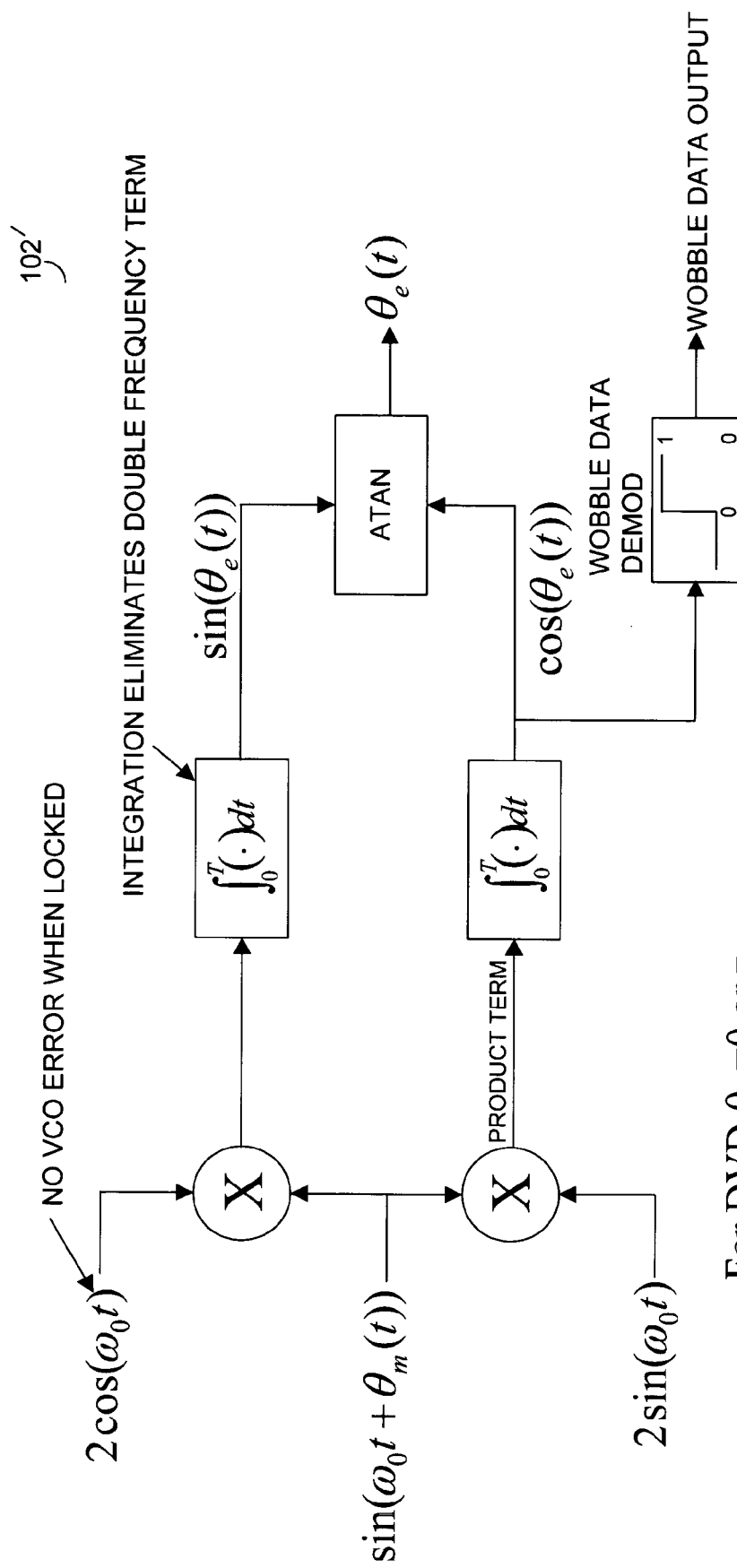
FIG. 9 illustrates a diagram of demodulation for DVD applications.

Referring to FIG. 9, a diagram of demodulation is shown for DVD applications. When the timing loop is locked, both a "1" and a "0" will generate a phase output Theta_e of 0. The result of the sine branch will be +1 or −1. Once locked, the timing loop naturally demodulates the wobble data.

Figure 10:
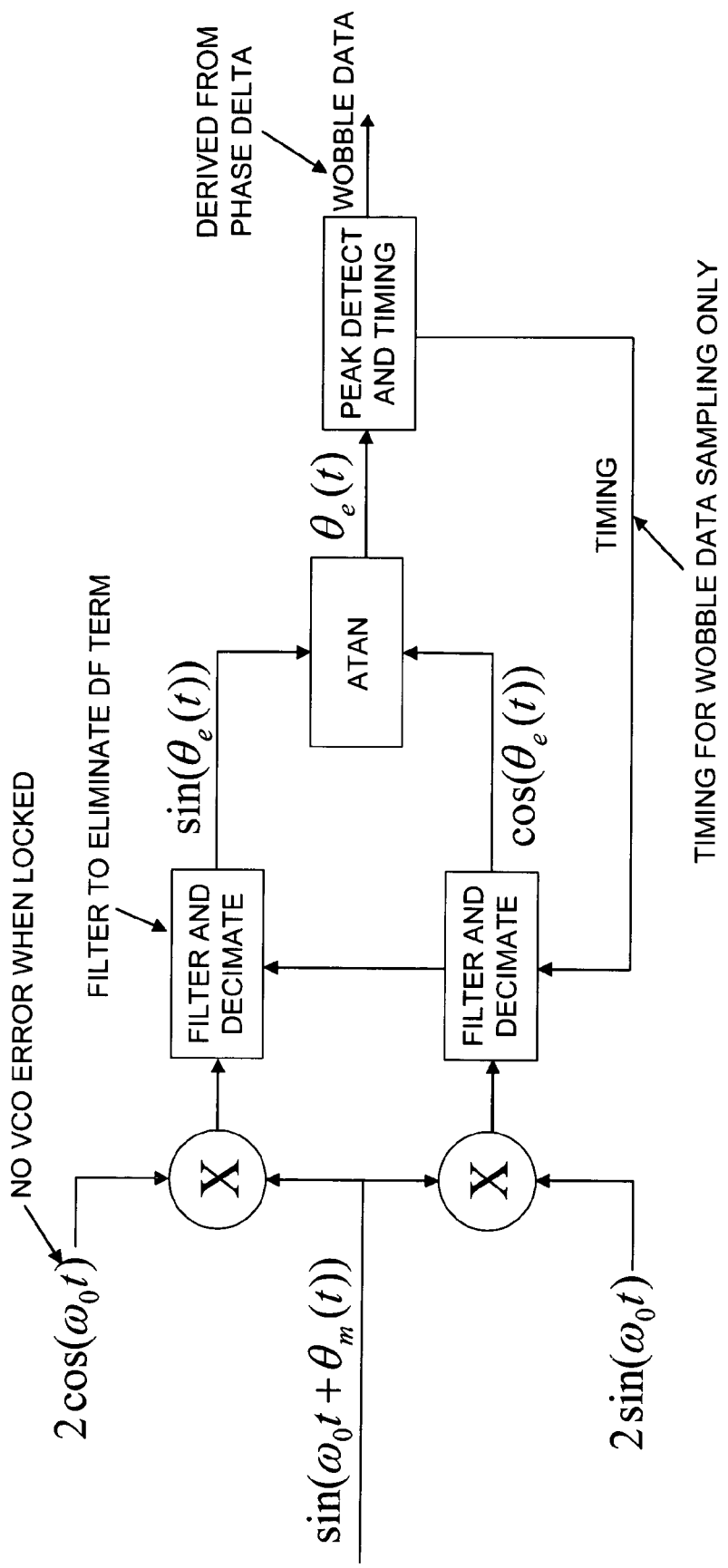
FIG. 10 illustrates a timing block schematic for CD applications.

Referring to FIG. 10, an example of demodulation for a CD is shown. The demodulation for a CD is inherently more problematic due to (i) the offset frequency not being known precisely, (ii) the carrier to wobble data phase being unknown, (iii) the signals not being orthogonal, and (iv) integration not removing a potential double frequency term. The phase of signal relative to carrier may be used to determine if input signal (i) increases for "1", decreases for a "0" and (ii) wobble data encoding keeps it bounded, creating a three level signal (plus two for sync mark).

Figure 11:
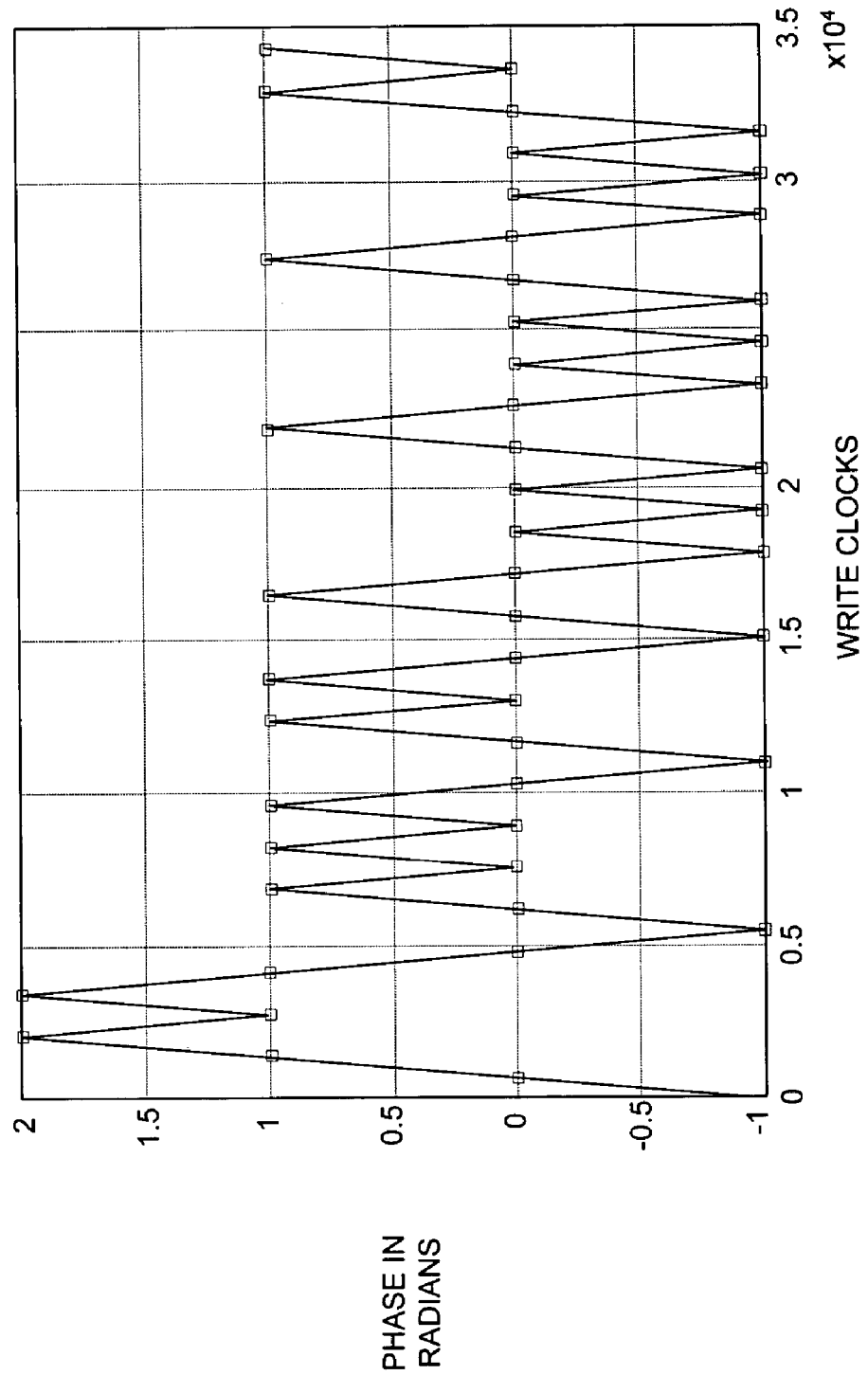
FIG. 11 illustrates the phase difference between the carrier and the wobble signal for ATIP (CD) data.

Referring to FIG. 11, a plot illustrates the phase difference between the carrier and the signal WOBBLE due to the ATIP data. If the VCO is phase locked to the carrier, then the output of the ATAN block in the demod circuit will be the line, and the end of each bit time is the black square. The channel bit 1 causes the phase to increase and channel bit zero causes the phase to decrease. So if a particular square has larger phase than the previous square, the channel bit must have been one. If the phase decreased between the two, the channel bit must have been zero. Using this idea, the channel data bits can be read off as 1,1,1,0,1,0,0,0 (this is the synch mark) followed by 1,1 (ATIP bit 0), 0,1 (ATIP bit 1) 0,1 (ATIP bit 1) and so on. The timing loop of the present invention controls the divided VCO output to have the same fundamental frequency as the carrier. The wobble demodulation samples the squares and then demodulates the channel bits as described above.

As used herein, the term "simultaneously" is meant to describe events that share some common time period but the term is not meant to be limited to events that begin at the same point in time, end at the same point in time, or have the same duration.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a clock generation circuit configured to generate an output clock signal in response to a control signal;
    a detect circuit configured to generate a detect signal in response to (i) said output clock signal and (ii) an input signal; and
    a select circuit configured to generate said control signal by selecting (i) a first input when in a first mode (ii) said detect signal when in a second mode, wherein said first and second mode are selected in response to a selection signal, wherein said select circuit further responds to a second input when in a third mode when either said first input or said detect signal are not present.

2. The apparatus according to claim 1, wherein said first mode comprises a read mode and said second mode comprises a wobble mode.

3. The apparatus according to claim 1, wherein said clock generation circuit comprises an analog clock generation circuit.

4. The apparatus according to claim 1, wherein said clock generation circuit comprises (i) a loop filter and (ii) a voltage controlled oscillator (VCO).

5. The apparatus according to claim 1, wherein said clock generation circuit is configured to generate said output signal when in said first mode, said second mode and said third mode.

6. The apparatus according to claim 1, wherein said clock generator circuit comprises:
    a digitally controlled oscillator.

7. The apparatus according to claim 1, wherein said detect circuit comprises a phase detect circuit configured to generate a phase error signal in response to said output clock signal and a second control signal.

8. An apparatus comprising:
    a clock generation circuit configured to generate an output clock signal in response to a first control signal; and
    a phase circuit configured to generate a phase error signal in response to said output signal and a second control signal, wherein said phase circuit (A) comprises: (i) a phase select circuit, (ii) a first and second integration circuit, each configured to present phase signals, and (iii) a computation circuit configured to generate a phase calculation signal in response to said chase signals and (B) generates said phase error signal in response to said phase calculation signal.

9. The apparatus according to claim 8, wherein said first control signal comprises a read channel signal and said second control signal comprises a wobble signal.

10. The apparatus according to claim 8, further comprising:
    a variable delay circuit configured to delay said output clock signal in response to said phase error signal.

11. A method for synchronizing a signal, comprising the steps of:
    (A) generating an output clock signal in response to a control signal;
    (B) generating a detect signal in response to (i) said output clock signal and (ii) an input signal; and
    (C) generating said control signal by selecting (i) a first input when in a first mode (ii) said detect signal when in a second mode, in response to a selection signal, wherein step (C) further responds to a second input when in a third mode when either said first input or said detect signal are not present.

12. The method according to claim 11, wherein said first mode comprises a read mode and said second mode comprises a wobble mode.

* * * * *